(No Model.)

C. E. HALLOWELL.
HAT FASTENER.

No. 574,149. Patented Dec. 29, 1896.

ATTEST.
Otis D. Swett.
Chas. P. Swett.

INVENTOR.
Charles E. Hallowell.
By J. Henry Kaiser
Atty.

UNITED STATES PATENT OFFICE.

CHARLES EDWARD HALLOWELL, OF PHILADELPHIA, PENNSYLVANIA.

HAT-FASTENER.

SPECIFICATION forming part of Letters Patent No. 574,149, dated December 29, 1896.

Application filed June 1, 1896. Serial No. 593,916. (No model.)

*To all whom it may concern:*

Be it known that I, CHARLES EDWARD HALLOWELL, a citizen of the United States, residing at Philadelphia, in the county of Philadelphia and State of Pennsylvania, have invented certain new and useful Improvements in Hat-Fasteners; and I do hereby declare the following to be a full, clear, and exact description of the invention, such as will enable others skilled in the art to which it appertains to make and use the same.

This invention relates to hat-fasteners, and especially to hat-fasteners adapted to be attached to ladies' hats and operating to engage the hair of the wearer and retain the hat in place upon the head, and has for its object to provide a device of the character described which shall be simple in construction, efficient in operation, and ornamental in appearance, and which shall be capable of being manufactured at small cost.

To these ends my invention consists in the features and in the construction, combination, and arrangement of parts hereinafter described, and definitely pointed out in the claims following the description, reference being had to the accompanying drawings, forming a part of this specification, wherein—

Figure 1:
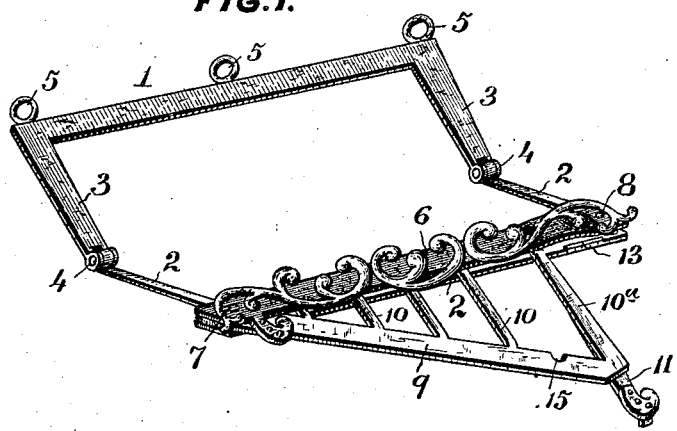
Figure 2:
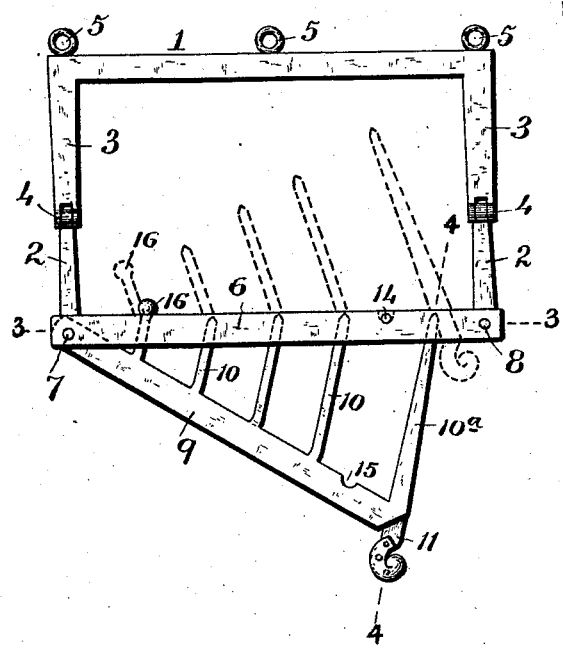
Figure 3:
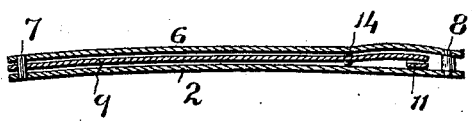
Figure 4:
Figure 5:
Figure 6:
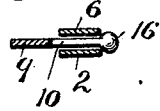

Figure 1 is a perspective view of my improved fastener. Fig. 2 is a plan view thereof, the teeth being shown in their operative position in dotted lines. Fig. 3 is a detail sectional view on the line 3 3 of Fig. 2. Fig. 4 is a similar view on the line 4 4 of Fig. 2. Fig. 5 is a detail sectional view illustrating the stop 14, and Fig. 6 is a similar view illustrating the stop 16.

Referring to the drawings, the numeral 1 indicates a rectangular frame consisting of two members or leaves 2 and 3, hinged together, as at 4, one of said leaves, 3, being provided with eyes 5 to serve as a means for attachment to the hat in the manner hereinafter described. To the outer portion of the leaf 2 is attached a bar 6, said bar being attached at its opposite ends to the leaf 2 by rivets 7 and 8, the said bar and leaf being parallel one with the other and separated from each other slightly by the rivets, as shown. Pivoted upon the rivet 7 is one end of a bar 9, that is provided with a plurality of teeth 10, each succeeding tooth being longer than the tooth preceding it, the shortest tooth being located near the pivoted end of the bar. Said bar and teeth are adapted to oscillate between the leaf 2 and bar 6, the outermost tooth $10^a$, or that tooth located at the free end of the pivoted bar 9, being split longitudinally to form a spring-finger 11, which is provided upon one side with an indenture 12, that is adapted to engage a feather 13, formed on the leaf 2, and lock the toothed bar 9 in its operative position. A stop-pin 14 is formed on or attached to the inner side of the bar 6, against which the toothed bar 9 is adapted to impinge, and serves to limit the inward movement of said toothed bar.

In order that the toothed bar 9 may be passed between the bar 6 and leaf 2 to its full extent, I form a notch or recess 15 on the inner edge of the bar 9, which registers with the stop-pin 14 when the said bar 9 is pushed inward to cause the teeth to engage the hair. One of the teeth 10, preferably the shortest one, is provided with an enlargement or head 16, which when the toothed bar is pulled outward engages the edges of the bar 6 and leaf 2 and limits the outward movement of the said toothed bar.

The leaf 3 of the frame 1 is attached to the inner side of the crown of the hat by stitching the eyes 5 thereto, and in such manner that the hinges 4 of the frame 1 will lie approximately in the same plane as the rim of the hat. In practice two of the described fasteners will be attached to the hat, one upon each side.

The operation of my improved fastener is as follows: To fasten the hat in place on the head of the wearer, the spring-finger 11 is pressed against the tooth $10^a$ to release it from the feather 13, and the toothed bar 9 is swung outward upon its pivot until its movement is arrested by the head 16, in which position the points of all the teeth will be retracted between the bar 6 and leaf 2, whereby the hat may be adjusted as desired by the wearer without any liability of the teeth catching the hair and interfering with the adjustment of the hat or disarranging the hair. The hat having been adjusted to the desired position the toothed bars are pushed inward until the indenture 12 on the spring-finger 11 engages the feather 13, thus locking the toothed bar against movement. The teeth are thus caused to penetrate and engage the hair of the wearer and retain the hat firmly in place.

By forming the frame 1 of two leaves hinged together and attaching the leaf 3 to the hat the leaf 2, carrying the toothed bar, may be turned at any desired angle to cause the teeth to penetrate the hair in a direction best adapted to retain the hat in place and to suit the style in which the hair may be dressed and to conform to the configuration of the head and conduce to the comfort of the wearer. Inasmuch as the arc described by the movement of the bar 9 increases from its pivotal point toward its free end, the teeth are made of a gradually-increasing length, as described, whereby, when the bar is moved to its farthest outward position, the points of all the teeth will be retracted between the bar 6 and leaf 2. Moreover, by forming the teeth in such manner the longest teeth penetrate the hair at the back, where it is the thickest, while the short teeth engage the hair on the sides of the head, where it is thinner.

In practice I provide the bar 6 with any suitable or preferred ornamentation which presents to the fastener the appearance of an ornamental hair-pin.

Having described my invention, what I claim is—

1. In a hat fastener, the combination with a frame consisting of two hinged leaves, one of which is provided with means for attachment to the hat, of a toothed bar pivoted at one end to the other leaf, and means for locking said bar in its operative position, substantially as described.

2. In a hat-fastener the combination with a frame provided with means for attachment to a hat, of a bar pivotally attached at one end to said frame, and adapted to oscillate in the arc of a circle and provided with a plurality of teeth, each succeeding tooth being longer than the preceding one, the shortest tooth being arranged adjacent to the pivotal point of the bar substantially as described and for the purpose specified.

3. In a hat-fastener, the combination with a frame provided with means for attachment to a hat, of a toothed bar pivotally attached at one end to said frame, and stops for limiting the oscillating movement of said toothed bar in both directions, substantially as described.

4. In a hat-fastener, the combination with a frame provided with means for attachment to a hat, of a toothed bar pivotally attached at one end to said frame, stops for limiting the oscillating movement of said bar in both directions, and means for locking said toothed bar in its operative position, substantially as described.

5. In a hat-fastener the combination with the frame consisting of the hinged leaves 2 3, of the bar 6 arranged parallel and attached to the leaf 2, the toothed bar 9 pivoted at one end between the bar 6 and leaf 2 and adapted to be folded between said bar and leaf to cause the teeth to penetrate the hair, and means for locking said bar in operative position, substantially as described.

6. In a hat-fastener, the combination with the frame consisting of the hinged leaves 2 3, of the bar 6 arranged parallel to and attached to the opposite ends of the leaf 2, the toothed bar 9 pivoted at one end between the bar 6 and leaf 2 and adapted to be folded between said bar and leaf to cause the teeth to penetrate the hair, and a head 16 formed on the end of one of said teeth and operating to limit the outward movement of said toothed bar, substantially as described.

7. In a hat-fastener, the combination with the frame consisting of the hinged leaves 2 3, of the bar 6 arranged parallel to and attached to the opposite ends of the leaf 2, the toothed bar 9 pivoted at one end between the bar 6 and leaf 2 and adapted to be folded between said bar and leaf to cause the teeth to penetrate the hair, the tooth $10^a$ carried by the free end of said bar and provided with an indentured spring-finger 11, and a feather 13 formed on the leaf 2 and operating to engage the indenture in the spring-finger and lock the toothed bar in operative position, substantially as described.

8. In a hat-fastener, the combination with the frame consisting of the hinged leaves 2 3, of the bar 6 arranged parallel to and attached to the opposite ends of the leaf 2, the toothed bar 9 pivoted at one end between the bar 6 and leaf 2, and adapted to be folded between said bar and leaf to cause the teeth to penetrate the hair, and a stop-pin 14 arranged on the inner side of the bar 6 and operating to engage the edge of said toothed bar and limit its inward movement, substantially as described.

In testimony whereof I affix my signature in presence of two witnesses.

CHARLES EDWARD HALLOWELL.

Witnesses:
FREDERICK WILLIAM MURRAY,
ANNA HALLOWELL.